Jan. 13, 1942.   D. B. BAKER   2,269,968
SEAT
Filed Dec. 19, 1939   2 Sheets-Sheet 1
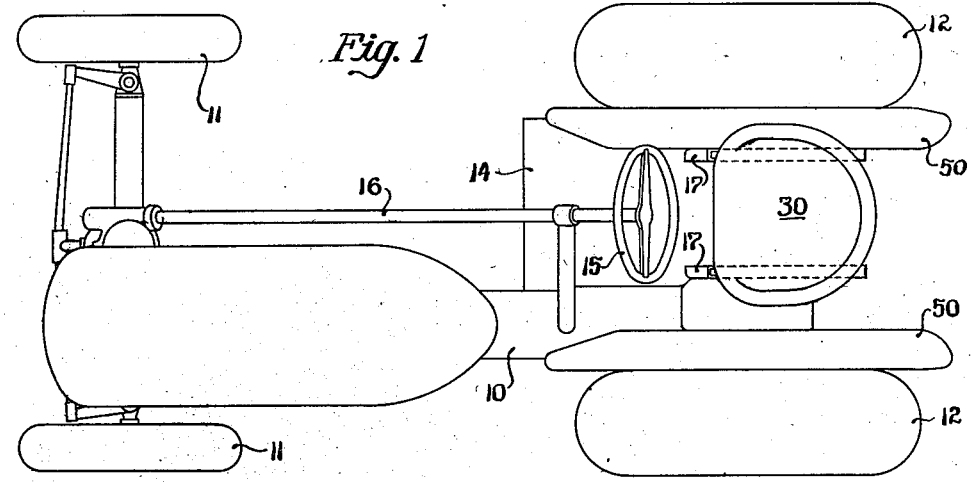
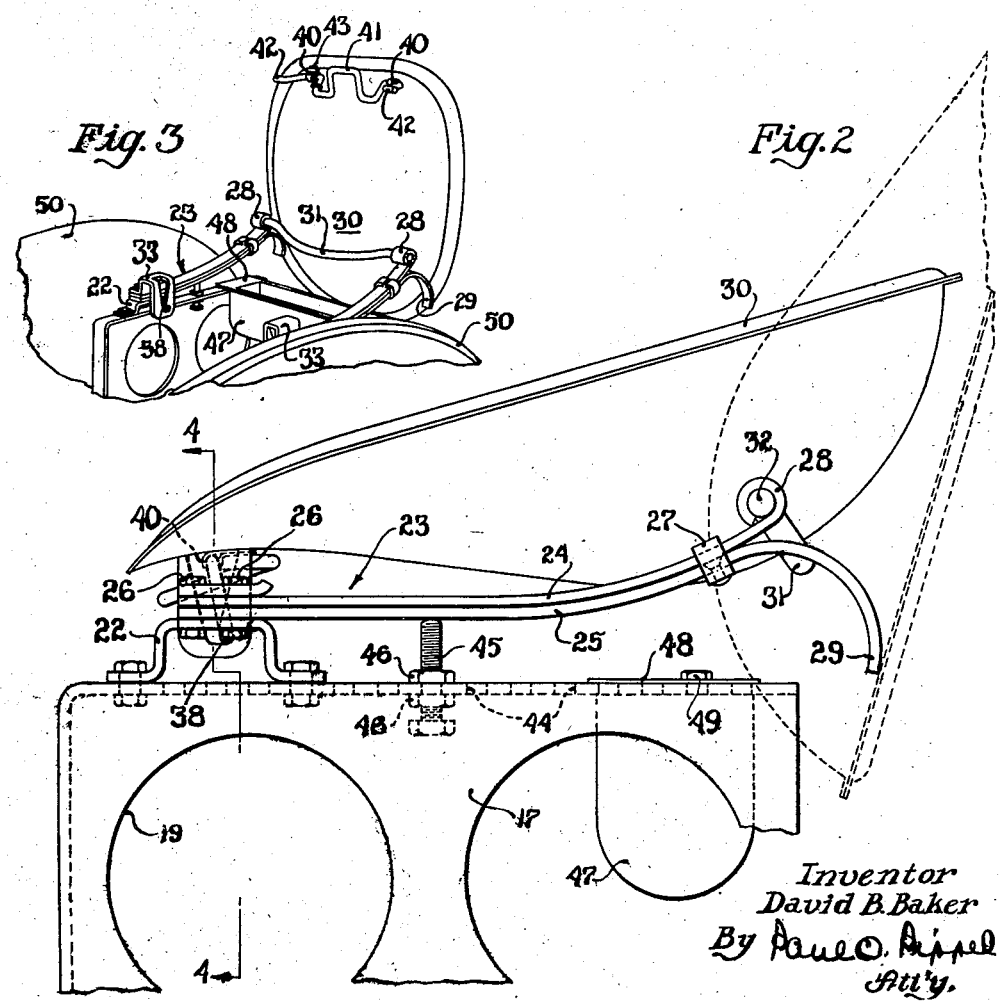
Inventor
David B. Baker
By Paul O. Appel
Att'y.

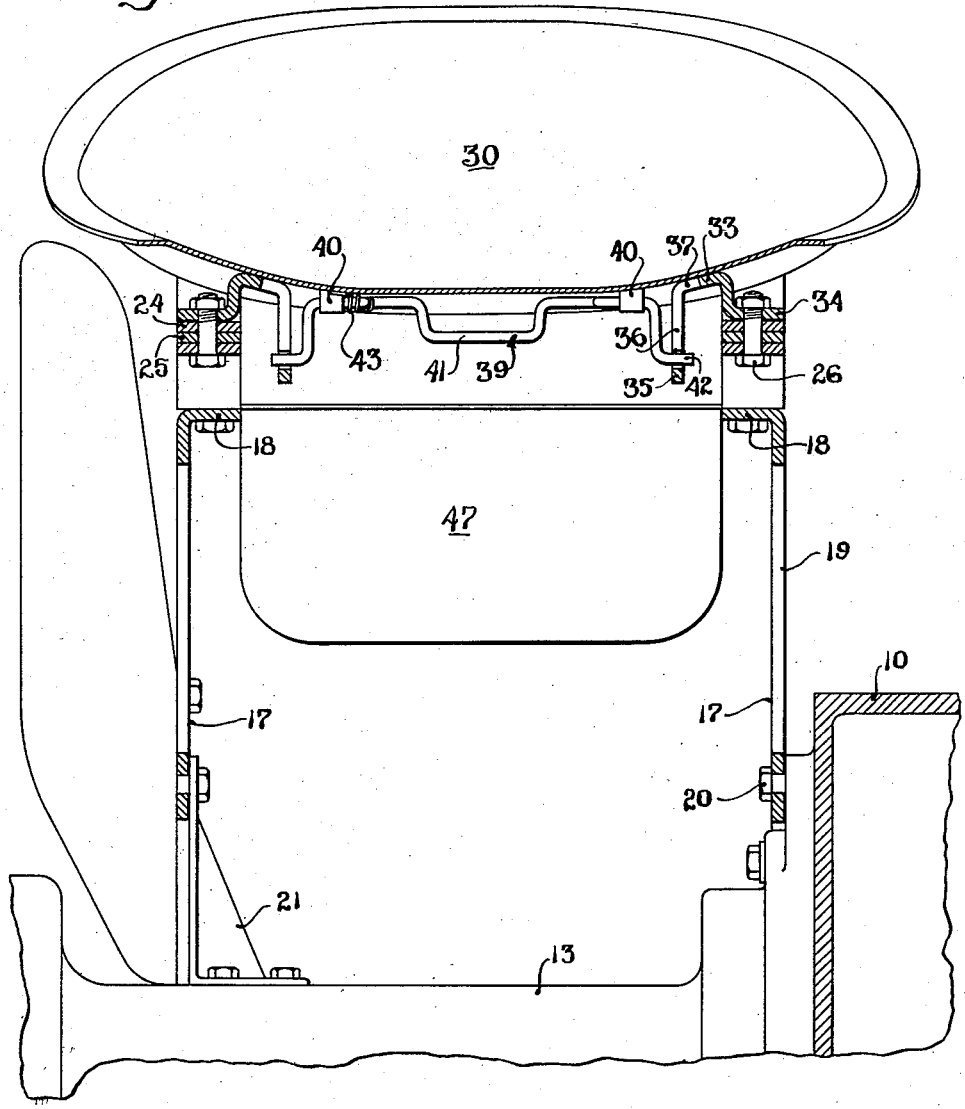

Patented Jan. 13, 1942

2,269,968

UNITED STATES PATENT OFFICE 2,269,968

SEAT

David B. Baker, Riverside, Ill., assignor to International Harvester Company, a corporation of New Jersey Application December 19, 1939, Serial No. 310,021

7 Claims. (Cl. 155—51)

This invention relates to an improved seat construction and especially to such a construction for vehicles.

The present invention contemplates improvements in seat constructions for vehicles of the agricultural type. In such vehicles, it is often desirable and sometimes necessary that the tractor operator assume a standing position while operating the tractor. The operator, while seated on the tractor, occupies a position with respect to the control members from which he can comfortably and easily control the tractor. When the operator desires to stand and to operate the tractor while so standing, he is not so comfortably disposed with respect to the tractor controls. This indisposition of the operator is caused by the forward edge of the seat interfering with the operator as he stands at the operator's station, which station in most instances is of a relatively small area, often consisting of only the cover plate of the rear transmission casing of the tractor body. The present invention provides a seat construction which may be moved away from its normal position to accommodate the tractor operator while standing. The arrangement is such that the operator may stand in substantially the same position relative to the controls as he occupied while seated.

The principal object of the invention, then, is the provision of a seat construction eliminating the aforesaid inadequacies of prior constructions as noted above.

An important object of the invention is to provide for the arrangement of the seat on a support including spring means, whereby the riding qualities of the tractor are materially increased.

Another object is to provide the spring means in the form of a pair of spaced leaf springs of the cantilever type.

Another object is to provide means for varying the rate and load-carrying capacity of the springs.

And, another object is to provide safety means in the form of a releasable latch, normally holding the seat in position to carry a seated operator and to prevent accidental movement of the seat.

Briefly and specifically these and other desirable objects are achieved in one preferred form of the invention by the provision of a seat construction at the rearward end of the body of a tractor of the agricultural type. The rear body, just rearwardly of the tractor steering wheel, is provided with a support on which is mounted a pair of laterally spaced, cantilever springs. The rearward ends of the springs provide journal portions on which a seat is mounted for upward and rearward tilting away from its normal position just rearwardly of the steering wheel. A releasable safety latch is provided for maintaining the seat normally in position to carry a seated operator. Each spring is provided with an adjustable means for varying the rate and load-carrying capacity thereof.

A more complete understanding of the desirable features of the invention may be had from the following detailed description taken in conjunction with the accompanying sheets of drawings, in which:

Figure 1 is a plan view of an agricultural tractor showing the arrangement of the seat thereon;

Figure 2 is an enlarged side elevational view, showing the seat construction as supported;

Figure 3 is a perspective view of the seat in tilted position; and,

Figure 4 is a transverse sectional view taken substantially on the line 4—4 of Figure 2.

The tractor chosen for the purposes of illustration comprises generally a main body 10 supported on a pair of steerable front wheels 11 and a pair of rear driving wheels 12 located at opposite sides of the tractor at opposite ends of the rear axle housing 13 (Figure 4). The tractor includes at its rearward end an operator's station 14, at which the various tractor controls are disposed. Only one of these control members has been illustrated, and this is the tractor steering wheel 15, which operates a steering rod 16 to steer the tractor front wheels 11. It will be understood, of course, that the vehicle in which the seat construction is adapted to be utilized may be of any type and is not necessarily limited to that type illustrated.

The operator's station 14 has mounted thereon the improved seat construction provided by the present invention. For the purposes of mounting the seat construction, the rear portion of the tractor, including the rear part of the body 10 and the axle housing 13 at one side thereof, has mounted thereon a support in the form of a pair of laterally spaced brackets or standards 17. This arrangement is best shown in Figure 4, wherein each bracket or standard is illustrated as having an upper, longitudinally extending, horizontal flange 18. The side wall portions of the standards 17 are cut out, as at 19, to eliminate excess weight. One standard 17 is bolted directly to a side wall portion at the side of the rear portion of the main body 10, as at 20, and the other standard is rigidly secured to an upper surface of the axle housing 13 by a bracket 21.

Each standard rigidly carries adjacent its forward end a bracket 22 in the form of an inverted U. This bracket in turn rigidly carries the forward end of a cantilever spring 23. Each spring 23 extends longitudinally rearwardly above its respective support or standard 17 and is generally parallel to the upper horizontal flange 18 of said standard. Each spring 23 preferably comprises a pair of substantially coextensive leaves 24 and 25. These leaves are secured together at their forward ends by bolts 26 which serve also to secure the spring to the bracket 22. The leaves are secured together adjacent their rearward ends by a clip 27. The upper leaf 24 extends rearwardly of the clip 27 and is bent around to provide a journal portion 28. The spring as a whole is curved upwardly and rearwardly from the standard 17, and the lower leaf 25 is, rearwardly of the clip 27, directed downwardly and rearwardly to provide a stop portion 29, for a purpose which will hereinafter appear.

A seat 30, preferably of the bucket type, is mounted on the springs 23 for pivotal movement thereabout through the medium of a transverse rod 31, preferably welded to the bottom of the seat, and having alined, laterally extending, trunnion portions 32 journaled respectively in the journal portions 28 of the upper leaves 24 of the springs.

The bolts 26, previously described as mounting the springs 23, also provide for mounting a locking member 33. This member has a flange 34, through which the bolts 26 are passed. The member then extends upwardly to a height above the forward portion of a spring 23, whereat it is directed inwardly and then downwardly to provide a vertical portion 35. This portion is provided with a generally L-shaped slot 36. The upper portion of the slot is cut out of the horizontal portion of the member 33, as at 37. The lower portion of the slot, forming the horizontal part of the L, is cut out rearwardly in the portion 35, as at 38. The upper portions of the members 33 serve to support forward portions of the seat 30, the seat being thus cradled between the springs 23 and on the members 33.

A safety means in the form of a releasable latch is carried by the seat to provide for locking the seat to the members 33. For this purpose a latch rod 39 is movably carried by the seat through the medium of a pair of spaced brackets 40 welded or otherwise rigidly secured to the bottom of a forward portion of the seat. The rod 39 includes a central handle portion 41, generally in the form of a U, having its opposite legs directed rearwardly, laterally outwardly, and then forwardly, to provide the portions upon which the rod is mounted in the brackets or sleeves 40. Each of said lateral portions extends beyond its respective bracket 40 and is directed downwardly and again laterally outwardly to provide a hook portion 42. It will be understood that the portions 42 are provided at opposite ends of the rod 39, and these portions are adapted to cooperate respectively with the slot portions 38 of the slots 36 formed in the members 33. A coil spring 43 is coiled about a portion of the rod 39 and is arranged to urge the portions 42 of the rod always toward locked position with the locking members 33. The handle portion 41 of the rod 39 extends forwardly to a point conveniently close to the forward edge of the seat 30, so that it may be readily operated by an operator on the seat. It will be seen that the latch is released by moving the handle portion 41 upwardly toward the seat, whereat the locking portions 42 are disengaged from the slot portions 38. The seat may be thus tilted rearwardly about the axis provided by the alined pivots 28, 32. As best shown in Figure 4, and as previously described, the slots 36 in the members 33 are cut back, as at 37, so that the portions 42 of the rod 39 may pass freely therethrough when the seat is tilted upwardly and rearwardly or is returned to normal position.

The downwardly curved portions 29 of the lower spring leaves 25 of the springs 23 serve as stop portions to limit rearward tilting movement of the seat. This arrangement is best shown in the broken line position in Figure 2, wherein is shown a portion 29 engaging the flange of the seat 30.

As best shown in Figure 2, the horizontal flange portion 18 of each standard 17 is provided with a plurality of vertical openings 44. Any one of these openings is adapted to receive a vertically extending bolt 45 provided with a pair of lock nuts 46 which are threaded on the bolt respectively at the upper and lower faces of the portion 18. It will be noted that the openings 44 extend rearwardly from the bracket 22 on which the spring 23 is mounted. The bolt 45, by its cooperation with any selected opening 44, provides means for varying the rate and load-carrying capacity of a spring 23. In other words, the bolt 45 may be positioned longitudinally in the portion 18 of the standard 17 at various positions with respect to the mounted end of the spring 23, and the distance between the bracket 22 and the bolt 45 may thus be varied to satisfy any particular conditions. Forwardmost positions of the bolts 45 will, of course, permit easier flexing of the springs 23, and consequently the springs will have a lower spring rate as measured by oscillations per minute. This adjustment permits the seat to carry light weight operators easily and comfortably. The bolts 45 may be positioned rearwardly so that the seat may just as comfortably and easily carry heavier operators, in which case the load-carrying capacity of the springs is increased and the spring rate is higher as measured by oscillations per minute.

The standards 17 are adapted to carry therebetween a tool box 47. This box is provided with a flanged upper portion 48 which rests on the upper surfaces of the portions 18 of the standards 17. The box may be readily secured in position by means of a bolt 49.

The operator's station 14, on which is mounted the improved seat construction, is delineated at its opposite sides by rear wheel fenders 50.

From the foregoing description it will be seen that an improved seat construction has been provided for attaining the objects hereinbefore enumerated. Certain other features will be apparent to those skilled in the art. As previously mentioned, an important feature of the invention is to provide a spring-mounted seat capable of carrying a tractor operator easily and comfortably. Another important feature is the arrangement of the seat so that it may be moved away from the steering wheel 15, so that the operator may stand in substantially the same position he occupied while seated. The provision of a construction permitting the seat to be tilted upwardly and rearwardly enables the operator to stand between the spaced supports or standards 17, from which position he may control the tractor as easily as if he were seated. The latch means 39, 33 prevents accidental tilting of the seat. It will be readily apparent, of course, that ready access may be had to the tool box 47 when the seat is tilted. Access to the box may be had from the rear of the tractor when the seat is in normal position.

It will be understood that the seat construction illustrated and described is but one preferred form of the invention and that numerous modifications and alterations may be made therein without departing from the spirit and scope of the invention as defined in the appended claims.

What is claimed is:

1. A seat construction comprising a support, a pair of spaced leaf springs secured to the support, a seat movably carried by the springs for tipping upwardly with respect thereto, one of said springs including a portion serving as a stop to engage a portion of the seat in tipped position.

2. A seat construction comprising a support, a pair of spaced cantilever leaf springs carried each at one end by the support, each spring consisting of two leaf members, one member at its free end providing a pivot support and the other at its free end providing a stop, and a seat pivotally carried on the springs at the aforesaid pivot support and adapted to be tipped upwardly about said pivot, said seat being engageable with the aforesaid stop to limit tipping thereof.

3. A seat construction comprising a pair of spaced supports, a pair of cantilever leaf springs associated respectively with the supports, each spring being secured at one end to a respective support and disposed above said support and generally parallel thereto, a seat carried by and between the springs, and adjustable means associated between a spring and its respective support and adapted to be positioned at various points between the secured and free ends of the spring for varying the spring rate.

4. A seat construction comprising a support, a pair of spaced, cantilever leaf springs, each carried at one end by the support and each curving upwardly from the support toward its free end, each spring including at its free end a journal element, and a seat cradled between the springs at the free ends of the springs and including trunnion means associated with the aforesaid journal elements, said seat being tiltable upwardly about said trunnions.

5. A seat construction comprising a pair of spaced supports, a bracket member on each support, a pair of cantilever leaf springs secured respectively to the brackets in spaced relation above the supports, a seat tiltably carried at one portion thereof by the free ends of the springs and at another portion thereof by the brackets, and releasable means associated between the seat and a bracket to hold said seat against tilting.

6. In a tractor having a main, longitudinal body including a transverse rear axle housing, a seat construction therefor comprising a pair of spaced, vertical standards rigidly carried by said housing, a pair of cantilever leaf springs carried respectively by said standards, each spring being carried at one end by the respective standard and extending longitudinally of the tractor body, and a seat pivotally carried on the free ends of the springs on a transverse axis.

7. A seat construction comprising a support, a pair of spaced apart cantilever springs each secured at one end to the support and extending away from the support, a seat having opposite end portions, one of which is disposed at the free ends of the springs and the other of which is disposed adjacent and resting on the support, and means connecting the first end portion to the spring.

DAVID B. BAKER.